United States Patent [19]

Taylor et al.

[11] 4,419,838

[45] Dec. 13, 1983

[54] DIAGRAM BOARD ELEMENT

[75] Inventors: Frank Taylor, St. Eustache; Klemens Maurer, Candiac, both of Canada

[73] Assignee: Monitronik Ltee, Quebec, Canada

[21] Appl. No.: 390,057

[22] Filed: Jun. 18, 1982

[51] Int. Cl.³ .............................................. G09F 7/00
[52] U.S. Cl. ...................................... 40/605; 40/622; 40/489
[58] Field of Search .................. 40/605, 584, 622, 430, 40/489; 434/430, 72; 46/17, 33

[56] References Cited

U.S. PATENT DOCUMENTS

| | | | |
|---|---|---|---|
| 1,225,305 | 5/1917 | Barnard | 434/430 |
| 2,610,413 | 9/1952 | Dasey | 434/72 |
| 3,130,512 | 4/1964 | Van Buren | 40/622 |
| 3,358,395 | 12/1967 | Simonovic | 40/489 |
| 3,582,927 | 6/1971 | Primavera | 434/430 |

*Primary Examiner*—Gene Mancene
*Assistant Examiner*—Wenceslao J. Contreras
*Attorney, Agent, or Firm*—Cushman, Darby & Cushman

[57] ABSTRACT

The disclosure herein describes an element which is adapted for connection to other components of a diagram board, such as a mosaic display panel, which element displays a pair of legs depending from one sidewall thereof; the outer face of one leg is concave while the outer face of the other leg is convex; the legs are made of elastic material so that they are flexible in a first direction which is in a plane perpendicular to the sidewall and in a second direction which is in a longitudinal plane that includes the pair of legs to enable engagement with another component of the assembly.

9 Claims, 4 Drawing Figures

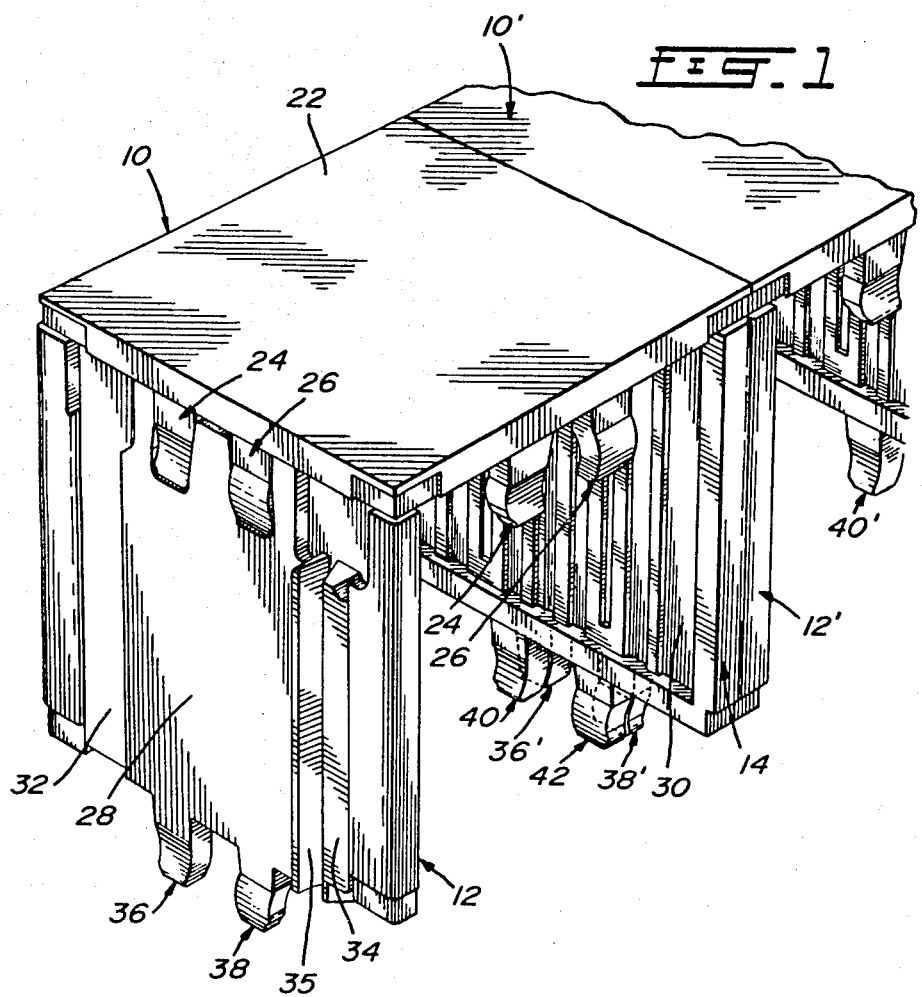

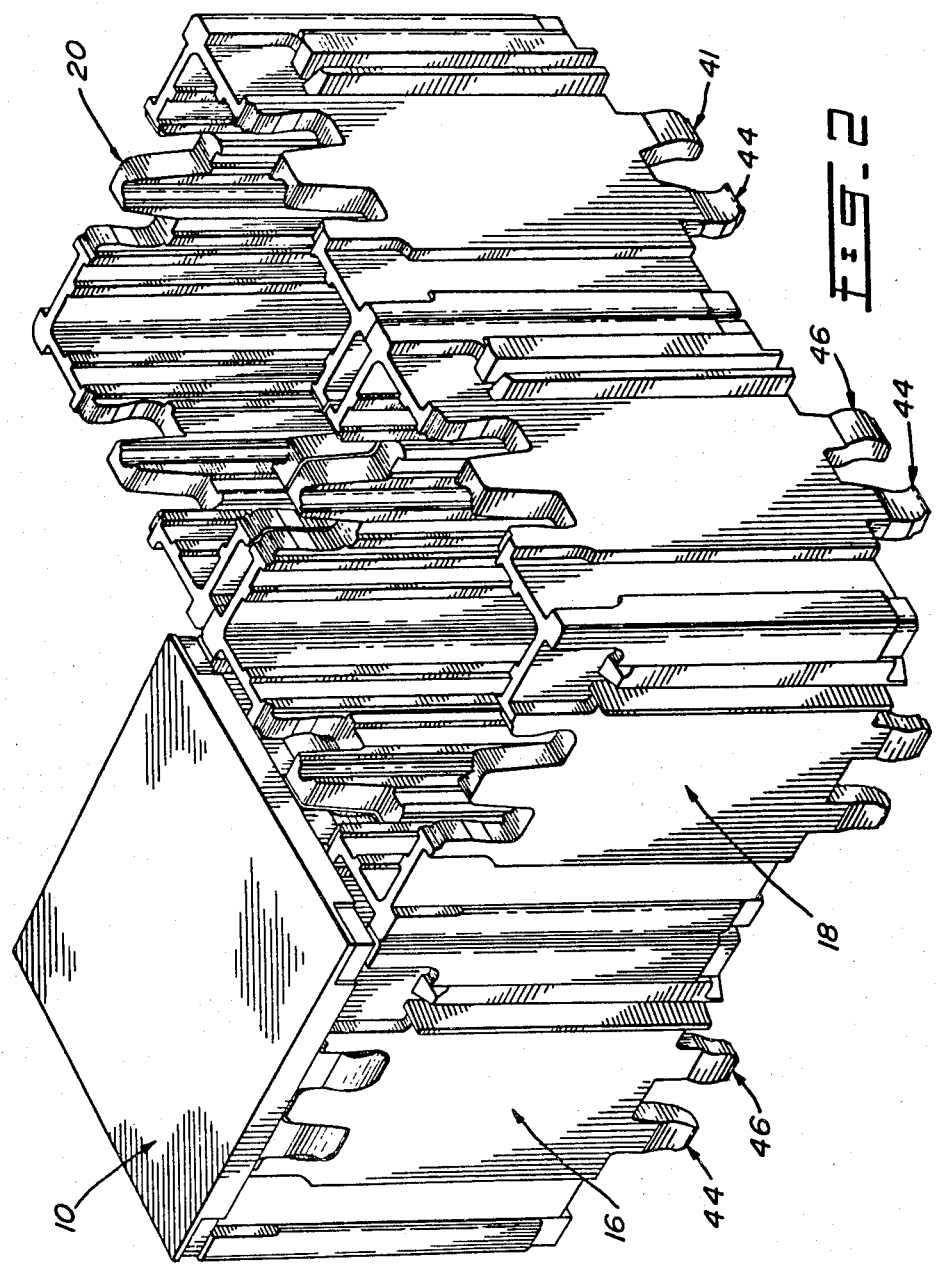

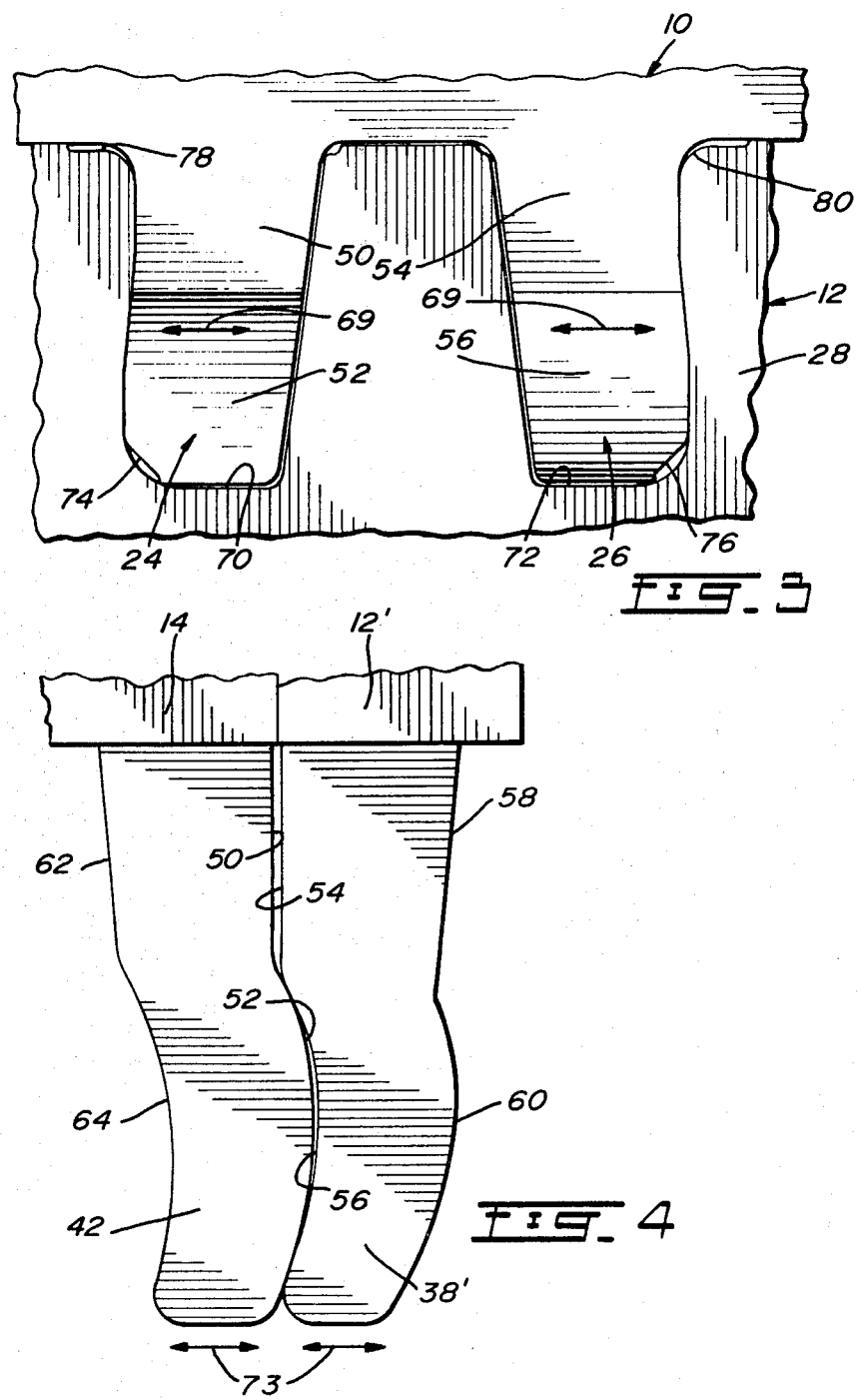

DIAGRAM BOARD ELEMENT

The present invention relates, in general, to diagram boards adapted primarily for representing large distribution or control systems, for example electric power distribution systems. More particularly, this invention concerns an element which is adapted for connection to other components forming part of such diagram boards. These boards are often called mosaic display instrument panels and are seen in public utilities and power companies where constant vigilance over a power distribution system must be maintained.

One example of such diagram boards is described in applicant's copending Canadian application Ser. No. 359,304 filed Aug. 29, 1980 and entitled "Mosaic Display Panel". A series of interconnected horizontal and vertical members support a mosaic of tiles and control instruments through interfitting components which include self-supporting interconnected blocks and mounting elements. In the above patent application, these components have the outer face of their sidewalls constructed with tabs and guideways, complementary in shape, so as to engage correspondingly shaped guideways and tabs of adjacently disposed components. Thus, a cluster of such components may be formed and, itself, be mounted to the support members to form a panel.

The present invention is concerned with improving the inter-connection between the components.

The elements of the prior art are made of thermoplastic material and a compression fit exists between the inter-connected parts. It has been found that the tension present in the material of these elements does not permit an overstressing so that the spring action which occurs during inter-connection is not a true spring action. This is explained by the fact that, when the parts are interconnected, there is material deformation which greatly affects the spring action thereby creating high engagement forces during the assembling of a diagram board and, even more so, when it is necessary to remove one or more components from the board to form a different diagram arrangement, for example to substitute a tile for another, or for an instrument, or to replace a damaged component.

It is an object of this invention to provide an element which is adapted to be mounted to another component of such diagram board and which overcomes the problems described above in relation to prior display panels. The present invention is achieved by constructing the connecting element with interfitting means which are no longer present on the sidewalls of the element. Indeed, the present invention provides a pair of legs which depend from at least one sidewall of the element and which are shaped to engage a mating part on the diagram board component to which it is designed to be mounted.

The present invention therefore relates, in its broadest aspect, to an element adapted for connection to components of a diagram board which comprises: a rectangular body including at least one pair of depending transversally spaced legs, projecting beyond one sidewall of the body and integral therewith, each leg having an inner face and an outer face and opposite side faces, each outer face including a curved portion; the curved portion of the outer face of one leg of a pair is concave while the curved portion of the outer face of the other leg is convex; the legs are made of elastic material so that the legs are flexible in a first direction which is in a plane perpendicular to the sidewall and in a second direction which is in a longitudinal plane including the pair of legs to enable engagement with another component of the assembly.

The scope of applicability of the present invention will become apparent from the detailed description given hereinafter; it should be understood, however, that this description, while indicating preferred embodiments of the invention, is given by way of illustration only since various changes and modifications within the spirit and scope of the invention will become apparent to those skilled in the art.

IN THE DRAWINGS

FIG. 1 is a perspective view showing three interconnected components of a mosaic display panel embodying the present invention;

FIG. 2 is a perspective view showing four interconnected components embodying the present invention;

FIG. 3 is a partial enlarged elevational view of a pair of legs being inter-connected to another component of a diagram board; and FIG. 4 is a partial enlarged elevational view showing the connection between two pair of legs.

Referring to FIGS. 1 and 2, there are shown some of the components which may form part, when interconnected, and mounted to appropriate horizontal and vertical supports of a mosaic instrument display panel such as the one shown in applicant's above-mentioned copending patent application. For example, FIG. 1 shows a tile 10 and two longitudinal side supports 12 which define an inverted U shaped channel through which may passed various electrical conductors for instruments or lights which may be mounted to the display panel. In the case of FIG. 2, tile 10 is shown engaged to one of three serially connected self-supporting blocks 16, 18 and 20 which have identical configuration. The construction of each sidewall is described and claimed in a copending patent Canadian application filed concurrently herewith.

Each of these components are preferably made of thermoplastic material and formed by injection molding. The tile 10 define with adjacently disposed tiles, such as 10' in FIG. 1, the front face of a display panel. The top face 22 of the tile may be plane or display a line or symbol such as seen on electrical power distribution panels for example. Also, the material may be opaque or translucid to transmit light in cases where such a bulb is mounted behind the tile.

Tile 10 defines a rectangular body having four sidewalls, each sidewall displaying a pair of legs 24 and 26 transversely spaced from one another and depending from the sidewall.

Referring to FIG. 1, the display panel components 12 and 14 are identical in construction and each include an outer wall 28 and an inner wall 30. The outer wall 28 displays a channel 32 and projections 34 and 35 which are described and claimed in applicant's copending Canadian application filed concurrently herewith. The inner wall 30 is structured so as to support instruments such as electrical switches, lamps or the like. Each sidewall 28, 30 of these components includes a pair of depending legs 36 and 38, 40 and 42 which are all identical in shape to the pair of legs 24 and 26 forming part of tile 10. Components 12 and 14 may vary in length so that it is possible to have on each component one or more pair of legs.

Referring to FIG. 2, tile 10 is shown mounted on three self-supporting blocks 16, 18 and 20 where blocks 16 and 20 are shown inter-connected to the middle block 18. Each block displays a rectangular body having four sidewalls, each sidewall having a shape similar to that of components 12, 14 in FIG. 1. Again, the particular condiguration of the outer face of each sidewall of each block is described and claimed in the above-mentioned Canadian patent application filed concurrently herewith. In FIG. 2, each sidewall of each block includes a pair of depending legs 44 and 46 which are identical in construction to that of the pair of legs 24 and 26 of tile 10 or the pair of legs 36, 38 and 40, 42 of respective components 12 and 14.

A detailed description of each pair of legs will now be given with reference to FIGS. 3 and 4 which show two types of inter-engagement with adjacent components. An important feature of the present invention is that legs 24 and 26 are adapted to flex in two directions: one direction is perpendicular to the plane of the sidewall while the second direction is in a plane extending through both legs.

FIG. 3 represent the inter-connection of legs 24 and 26 of tile 10 with components 12 and 14 or with one of the self-supporting blocks 16, 18 and 20. Leg 24 has an outer face that includes a flat portion 50 and a concave portion 52 while the outer face of leg 26 has a flat portion 54 and a convex portion 56. The inner face of leg 24 has a flat portion 58 and a convex portion 60 while the inner face of leg 26 has a flat portion 62 and a concave 64. The inner face of each leg needs not have the configuration shown; for example, it may be flat. However, the configuration shown is preferred since it is envisaged to be engaged, for example, with a printed circuit board received in block 16, 18 or 20, the board being provided with legs similar to those of the present invention.

In the embodiment illustrated in FIG. 3, legs 24 and 26 are flexed towards one another as indicated by arrow 69 so as to tightly and frictionally engage the side walls of two U-shaped recesses 70 and 72 displayed at the upper edge of sidewall 28.

In the embodiment illustrated in FIG. 4, the legs flex in a plane perpendicular to the plane of the sidewall as indicated by arrow 73 to permit the passage of one leg next to another to finally come into inter-engagement with one another, i.e. with convex portion 52 in position in concave portion 56.

As can be seen in FIG. 4, the radius of curvature of the concave portion 56 is somewhat different from the radius of curvature of the convex portion 52 so that, once assembled, the legs will have line contacts therebetween rather that surface contact. Similarly, referring to FIG. 3, the width of legs 24 and 26 is somewhat smaller than that of recesses 70 and 72 to minimize a frictional contact between the parts in engagement with one another. Furthermore, to ease insertion of the legs into their respective recesses, the lower corners 74 and 76 of legs 24 and 26 are somewhat curved to follow the curved shoulders 78 and 80 of component 12.

For carrying out the injection molding process of these components, the legs have, on all sides, a tapering configuration from top to bottom.

Although the invention has been described above in connection with specific forms, it is to be understood that it may be modified and refined in various ways. For example, instead of using a thermo-plastic material, any material which is thermo-set, including metal, may be used to form at least the legs of the various components described above. It is therefore wished to have it understood that this invention should not be limited in interpretation except by the terms of the following claims.

The embodiments of the invention in which an exclusive property or privilege is claimed are defined as follows:

1. An element adapted for connection to components of a diagram board assembly comprising: a rectangular body including at least one pair of depending transversally spaced legs projecting beyond one sidewall of said body and being integral therewith, each leg having an inner face and an outer face and opposite side faces, said outer face including a curved portion; said legs of each pair being substantially in-line so that said all side faces thereof are intersected by an imaginary straight line substantially parallel to said cooperating sidewall; the curved portion of the outer face of one leg of a pair being concave while the curved portion of the outer face of the other leg being convex; and said legs being made of elastic material and mounted to said body so that said legs are flexible in a first direction, which is in a plane perpendicular to the sidewall, and are flexible in a second direction, which is in a longitudinal plane including said pair of legs and imaginary straight line to enable engagement with another component of said assembly.

2. An element adapted for connection to components of a diagram board assembly comprising: a rectangular body including opposite sidewalls, at least two opposing sidewalls each including at least one pair of depending transversely spaced legs, each leg having an inner face and an outer face and opposite side faces, each said outer face including a curved portion; said legs of each pair being substantially in-line so that said all side faces thereof are intersected by an imaginary straight line substantially parallel to said cooperating sidewall; the curved portion of the outer face of one leg of a pair being concave while the curved portion of the outer face of the other leg being convex; and said legs being made of elastic material and each pair of legs are mounted to said body so that said legs are flexible in a first direction, which is in a plane perpendicular to the sidewall, and are flexible in a second direction which is in a longitudinal plane including each said pair of legs and imaginary straight line to enable engagement with another component of said assembly.

3. A connecting element as defined in claim 1 or claim 2, wherein the curvature of the concavity of the outer face of one leg of a pair differs slightly from the curvature of the convexity of the outer face of the other leg of said pair so as to provide line contacts between engaging faces of two adjacently connected elements having similar leg construction.

4. A connecting element as defined in claim 1 or claim 2, wherein each said inner face include a curved portion; the curved portion of the inner face of one leg of a pair being concave while the inner face of the other leg of said pair is convex.

5. A connecting element as defined in claim 1 or claim 2, wherein the legs taper on all sides to the lower edge thereof.

6. An element adapted for connection to components of a diagram board comprising: a body having a plurality of sidewalls;

at least one pair of depending transversally spaced legs projecting beyond one sidewall of said body and being integral therewith, said legs being of elastic material; each leg having an inner face, an outer face, and first and second side faces; said legs first side faces being adjacent each other and substantially in-line along the length of said sidewalls, and said legs second side faces being substantially in-line with said first side faces of both legs, and each other; said leg first side faces extending from said sidewall at an angle so that imaginary extensions of said leg first side faces intersect, and imaginary extensions of said legs' second side faces intersect each other; the outer face of each leg including a curved portion; and the curved portion of the outer face of one leg of a pair being concave while the curved portion of the outer face of the other leg of the pair is convex.

7. A connecting element as defined in claim 6, wherein the curvature of the concavity of the outer face of one leg of a pair differs slightly from the curvature of the convexity of the outer face of the other leg of said pair so as to provide line contacts between engaging faces of two adjacently connected elements having similar leg construction.

8. A connecting element as defined in claim 6 or claim 7, wherein each said inner face includes a curved portion; the curved portion of the inner face of one leg of a pair being concave while the inner face of the other leg of said pair is convex.

9. A connecting element as defined in claim 6 wherein each leg includes a lower edge thereof, and wherein the intersection of each leg second side face and lower edge is curved to facilitate insertion of said legs into a cavity of a component with which said connecting element cooperate.

* * * * *